(12) United States Patent
DeLurio

(10) Patent No.: US 6,376,934 B1
(45) Date of Patent: Apr. 23, 2002

(54) VOLTAGE WAVEFORM GENERATOR

(75) Inventor: Michael J. DeLurio, Campbell, CA (US)

(73) Assignee: Sipex Corporation, Billerica, MA (US)

( * ) Notice: Subject to any disclaimer, the term of this patent is extended or adjusted under 35 U.S.C. 154(b) by 0 days.

(21) Appl. No.: 09/376,236

(22) Filed: Aug. 18, 1999

(51) Int. Cl.$^7$ ............................................... H05B 37/00
(52) U.S. Cl. .................. 307/125; 315/169.3; 315/209 R
(58) Field of Search ................................ 307/125, 115; 315/209 R, 224, 307, 169.3, DIG. 7

(56) References Cited

U.S. PATENT DOCUMENTS

| | | | | |
|---|---|---|---|---|
| 4,527,096 A | * | 7/1985 | Kindlmann | 315/169.3 |
| 4,999,618 A | | 3/1991 | Inada et al. | 340/781 |
| 5,006,838 A | | 4/1991 | Fujioka et al. | 340/781 |
| 5,148,049 A | | 9/1992 | Okutsu et al. | 307/270 |
| 5,559,402 A | * | 9/1996 | Corrigan, III | 315/169.3 |
| 5,594,462 A | | 1/1997 | Sakamoto | 345/76 |
| 5,677,599 A | | 10/1997 | Wood | 315/169.3 |
| 5,686,797 A | | 11/1997 | Sanderson | 315/209 R |
| 5,712,533 A | * | 1/1998 | Corti | 315/169.3 |
| 5,854,539 A | | 12/1998 | Pace et al. | 315/208 |
| 5,886,475 A | | 3/1999 | Horiuchi et al. | 315/169.3 |
| 5,994,843 A | * | 11/1999 | Kataoka et al. | 315/DIG. 7 |
| 6,038,153 A | * | 3/2000 | Andersson et al. | 363/97 |
| 6,081,075 A | * | 6/2000 | Littlefield | 315/209 R |
| 6,111,362 A | * | 8/2000 | Coughlan et al. | 315/169.3 |
| 6,157,138 A | * | 12/2000 | Andersson | 315/169.3 |
| 6,204,609 B1 | * | 3/2001 | Kimball | 315/169.3 |

FOREIGN PATENT DOCUMENTS

| | | | |
|---|---|---|---|
| EP | 535 885 A2 | 4/1993 | G09G/3/12 |
| EP | 535 885 A3 | 4/1993 | G09G/3/34 |
| EP | 535 885 B1 | 4/1993 | G09G/3/12 |
| EP | 699 015 A1 | 2/1996 | H05B/33/08 |
| EP | 782 373 A1 | 7/1997 | H05B/33/08 |
| JP | 09070470 | 3/1997 | A63F/7/02 |
| JP | 09094321 | 4/1997 | A63F/7/02 |
| WO | WO 98/57524 | 12/1998 | H05B/33/08 |

\* cited by examiner

Primary Examiner—Fritz Fleming
Assistant Examiner—Roberto Rios
(74) Attorney, Agent, or Firm—Testa, Hurwitz, & Thibeault

(57) ABSTRACT

A method and circuit for generating a voltage waveform across a capacitive load such as an electroluminescent device is described. The method includes the steps of charging and discharging the capacitive load using a constant current source. By sequentially performing the steps of providing a constant current through the capacitive load, eliminating the current, and discharging the capacitive load, a trapezoidal voltage waveform is achieved. In portable telephones and laptop computers with electroluminescent displays, the trapezoidal waveform results in reduced audible noise and power consumption.

4 Claims, 7 Drawing Sheets

VOLTAGE WAVEFORM GENERATOR

FIELD OF THE INVENTION

The invention relates generally to the field of voltage waveform generators and more specifically to the generation of a voltage waveforms across a capacitive load.

BACKGROUND OF THE INVENTION

Electroluminescent (EL) devices require an AC drive signal in order to produce illumination. The frequency of the drive signal is typically in the audio frequency range. As a result, audible noise can be generated. Devices such as portable telephones which operate in the audio frequency range and have EL lamps can be adversely affected by the EL hum or background noise. Similarly, laptop computers with EL displays can exhibit undesirable background noise.

Decreased power consumption is realized for waveforms that approximate a sinusoid at the EL drive frequency. Drive circuits which generate square waveforms or saw-tooth waveforms can be used to drive the EL lamp to reduce power consumption and audible noise. These circuits typically use thyristors or high voltage metal oxide semiconductor field effect transistors (MOSFETs) biased in the triode region as switching devices, however, this voltage control mode does not allow for accurate control of the EL lamp charge and discharge rates.

SUMMARY OF THE INVENTION

This invention relates to a method and circuit for generating a voltage waveform across a capacitive load. A plurality of switches are used to control the current through the capacitive load. Synchronized operation of the switches allows the capacitive load to be linearly charged and discharged. The circuit can be used to generate a trapezoidal waveform for driving an electroluminescent device. The trapezoidal waveform reduces audible noise which can be detrimental in audio devices having electroluminescent displays, such as portable telephones and laptop computers. In addition, the circuit and electroluminescent device achieve a higher power efficiency.

The method includes the steps of charging a reactive load with a substantially constant current, terminating the substantially constant current and discharging the capacitive load to generate a substantially constant current. In another embodiment, the method includes the steps of closing a first switch between a first terminal of the capacitive load and a first terminal of a substantially constant current source and closing a second switch between a second terminal of the capacitive load and a second terminal of the substantially constant current source so that the capacitive load is charged at a substantially linear rate. The embodiment includes the additional steps of opening the first switch, opening the second switch and closing a third switch between the first and second terminals of the capacitive load so that the capacitive load is discharged at a substantially linear rate. In another embodiment, the substantially linear charge rate and the substantially linear discharge rate are approximately equal.

The circuit includes a first switch between the first terminal of the capacitive load and the first terminal of the substantially constant current source, a second switch between the second terminal of the capacitive load and the second terminal of the substantially constant current source and a third switch between the first terminal of the capacitive load and the second terminal of the substantially constant current source. A substantially constant current linearly charges the capacitive load when the first and second switches are closed and the third switch is open. A substantially constant current is generated by the linear discharge of said capacitive load when the first and second switches are open and the third switch is closed.

BRIEF DESCRIPTION OF THE DRAWINGS

The invention is pointed out with particularity in the appended claims. The above and further advantages of the invention may be better understood by referring to the following description in conjunction with the accompanying drawings, in which:

DESCRIPTION OF THE PREFERRED EMBODIMENT

Figure 1A:
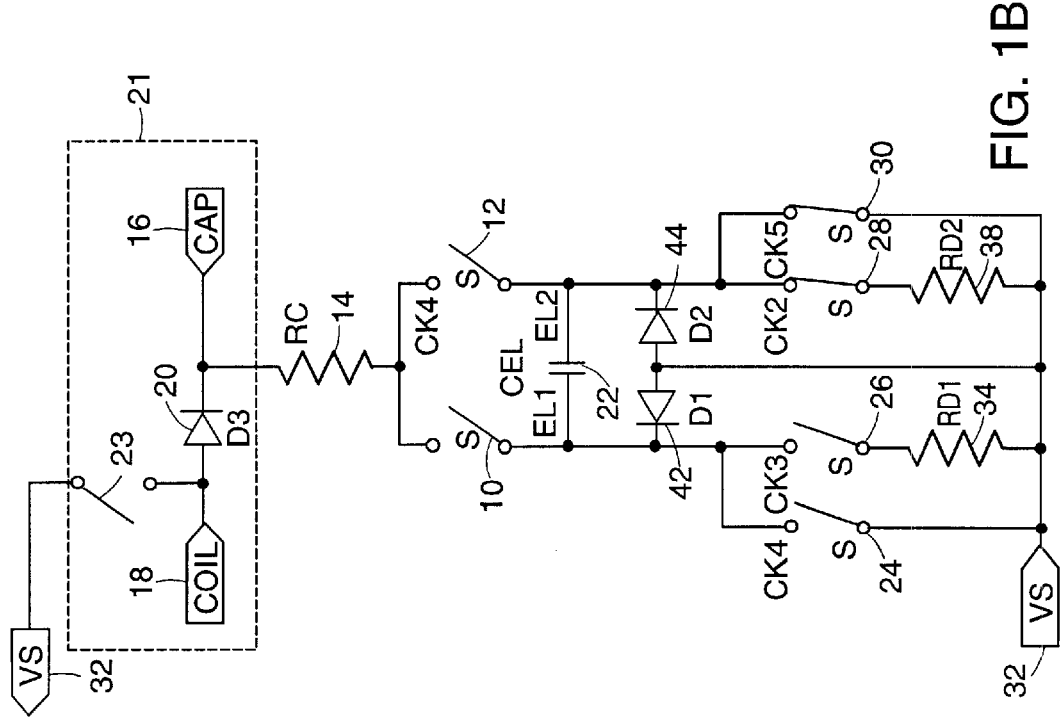
FIGS. 1(*a–f*) is a series of schematic state diagrams which depict an embodiment of the invention during six states of its operation.

In brief overview and referring to FIG. 1*a,* an embodiment of the invention includes a first switch 10 and a second switch 12 connected together through their first terminals to one terminal of a resistor 14. The other terminal of the resistor 14 is connected to one terminal of a capacitor 16 and one terminal of a coil 18 through a diode 20. A switch 23 is connected at one terminal to the common node between the coil 18 and diode 20. The other terminal of the switch 23 is connected to a reference voltage Vs 32. The combination of coil 18, diode 20, switch 23 and capacitor 16 form a boost converter 21 which charges capacitor 16 to a high voltage. In one embodiment the boost converter 21 operates at a frequency of 32 kHz. In another embodiment the boost converter is replaced by a DC voltage source.

The respective second terminals of switches 10 and 12 are connected to a respective side of a capacitive load 22 such as an electroluminescent lamp. Each respective second terminal of switches 10 and 12 is connected to a respective first terminal of a respective pair of switches 24, 26 and 28, 30. The second terminal of one switch 24, 30 of each pair of switches is connected to Vs 32. The second terminal of the other switch 26, 28 of each pair of switches is also connected to Vs 32 through a respective resistor 34, 38. A pair of diodes 42, 44 are arranged with their anodes connected to Vs 32, and with their respective cathodes connected to a respective second terminal of switches 10, 12. Typically Vs 32 is ground.

In operation, and referring again to FIG. 1*a*, initially switches 10, 28 and 30 are closed and switches 12, 24, and 26 are open causing capacitive load 22 to charge through resistor 14. Once the capacitive load 22 is charged, switch 10 opens (FIG. 1(*b*)) thereby causing the charging to cease. Referring to FIG. 1(*c*), at this time switches 28 and 30 are opened and switch 26 is closed, providing a discharge path across capacitive load 22 through resistor 34 and diode 44. Because resistor 34 has substantially the same value as resistor 14, the discharge rate of the capacitive load 22 is substantially the same as its rate of the charging.

Figure 1B:
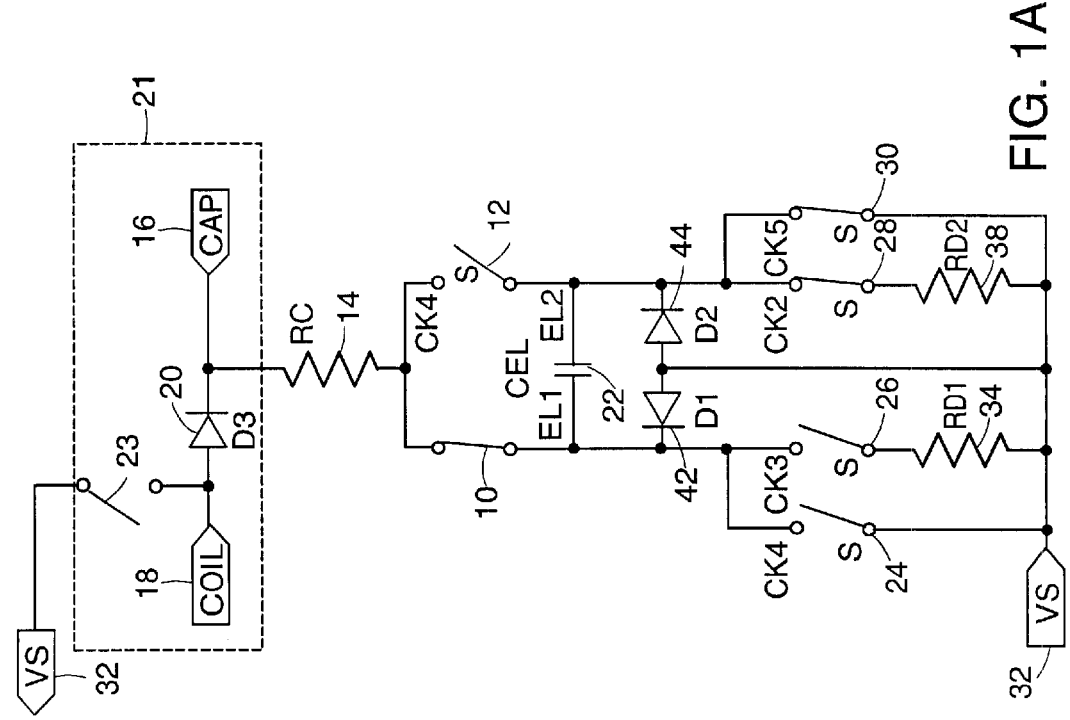
Figure 1C:
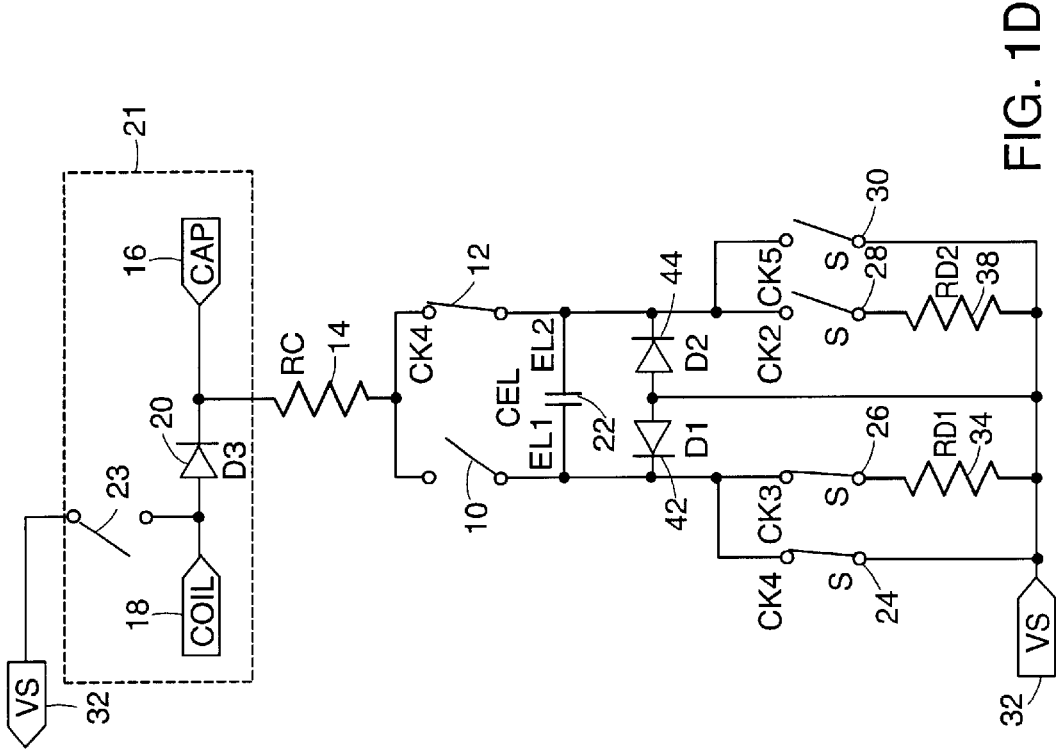
Figure 1D:
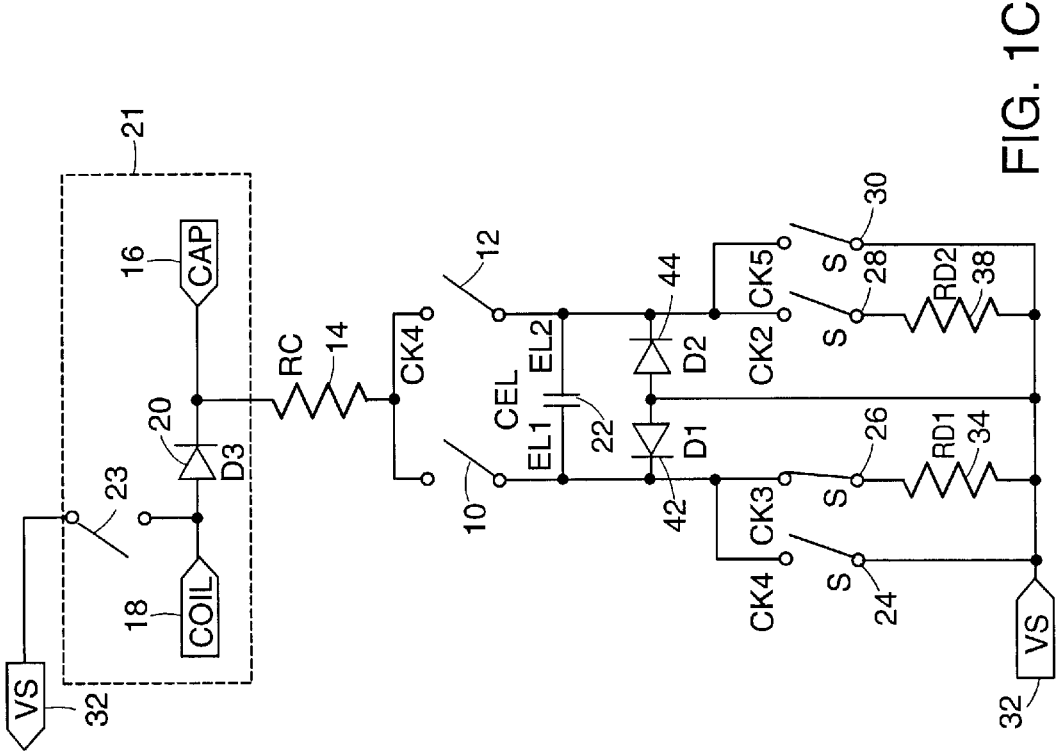
Figure 1E:
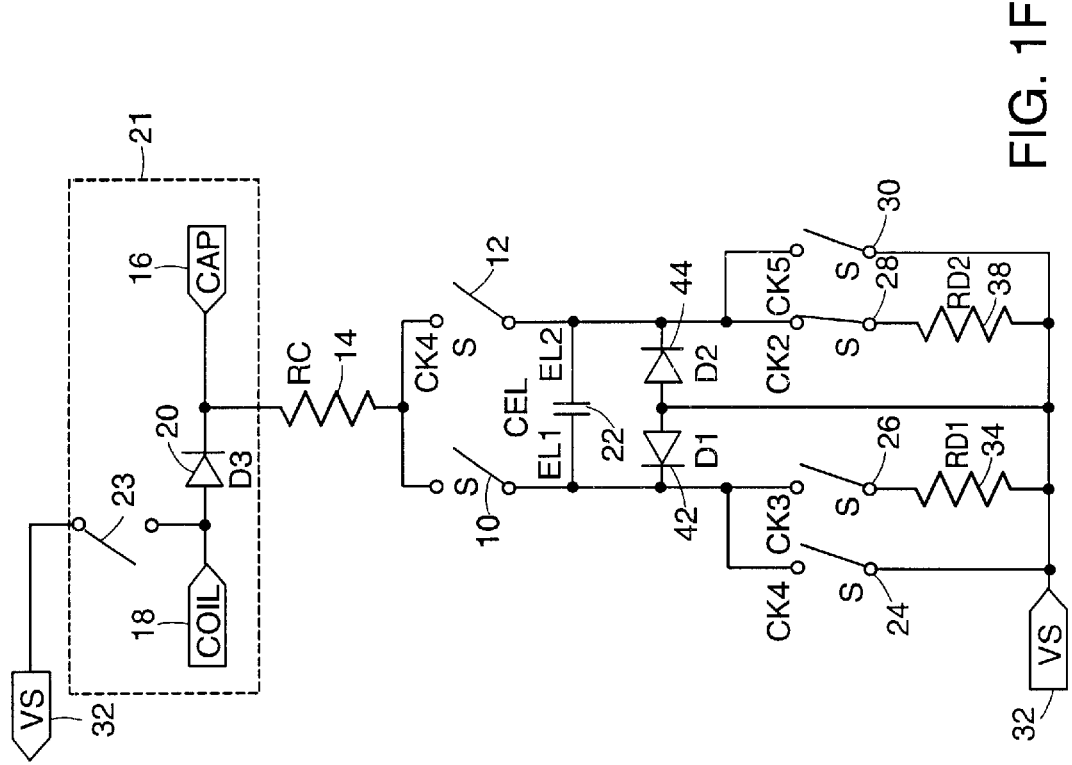
Figure 1F:
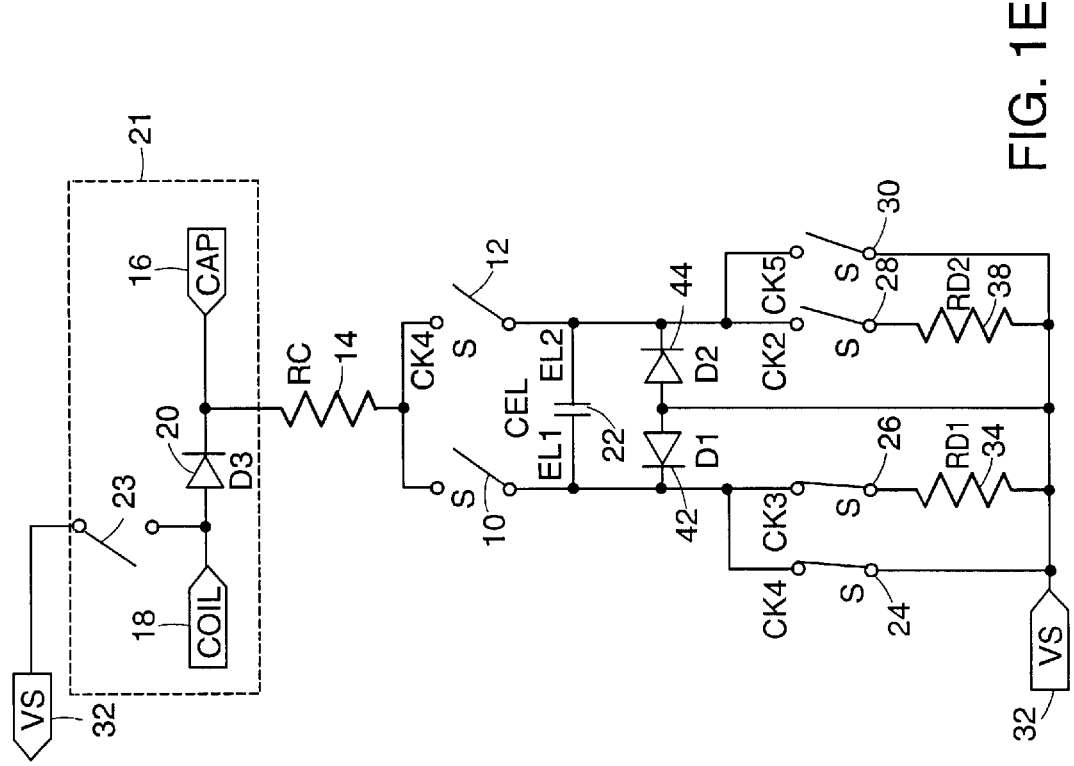

Next (FIG. 1(d)) switches 12, 24 and 26 are closed permitting the capacitive load 22 to charge through resistor 14 as in FIG. 1(a) only with the opposite polarity. Once the capacitive load 22 is charged, switch 12 opens (FIG. 1(e)) thereby causing the charging to cease. Referring to FIG. 1(f), at this time switches 24 and 26 are opened and switch 28 is closed, providing a discharge path across capacitive load 22 through resistor 38 and diode 42. Again, because resistor 38 has substantially the same value as resistor 14, the discharge rate of the capacitive load 22 is substantially the same as its rate of the charging.

Figure 2:
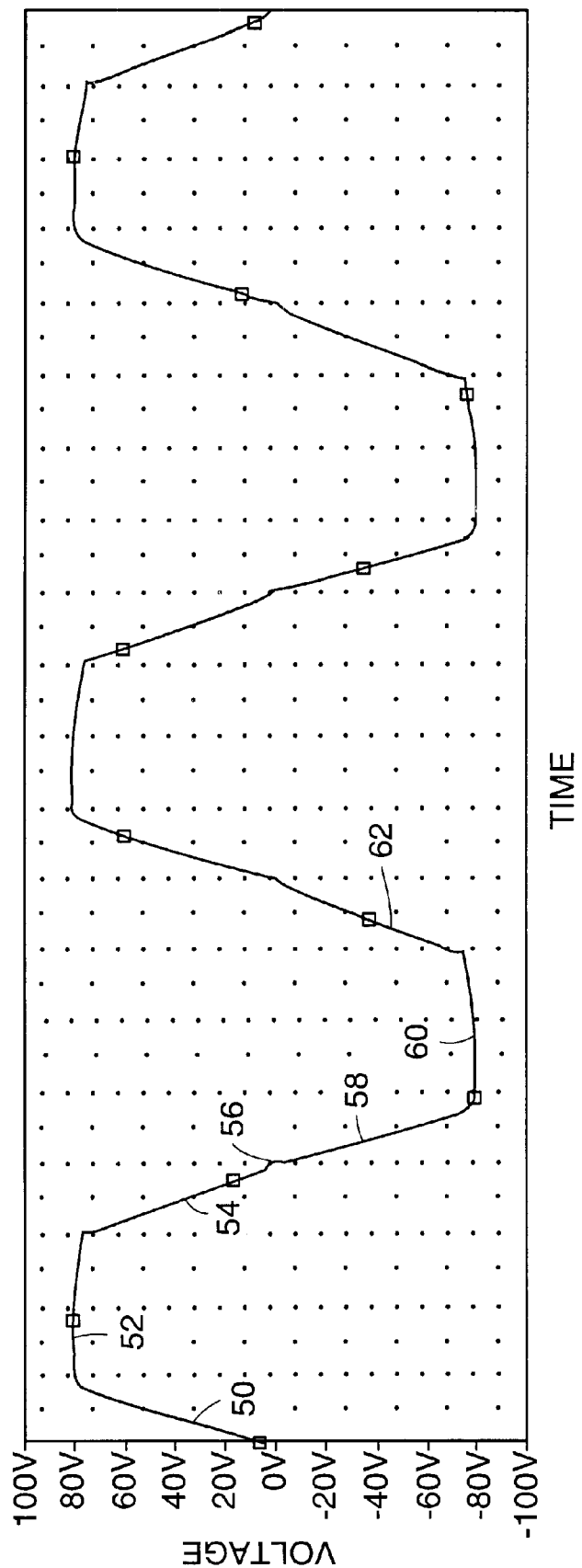
FIG. 2 is a voltage time diagram of the voltage produced across the capacitive load by the embodiment of the circuit shown in FIGS. 1(*a–f*)

The voltage waveform across the capacitive load 22 as a result of the operation of the switches shown in the embodiment of FIG. 1(a–f) is shown in FIG. 2. When the switches are positioned as shown in the first state (FIG. 1(a)), the capacitive load 22 is charging and the voltage across the load 22 rises substantially linearly 50.

Figure 3:
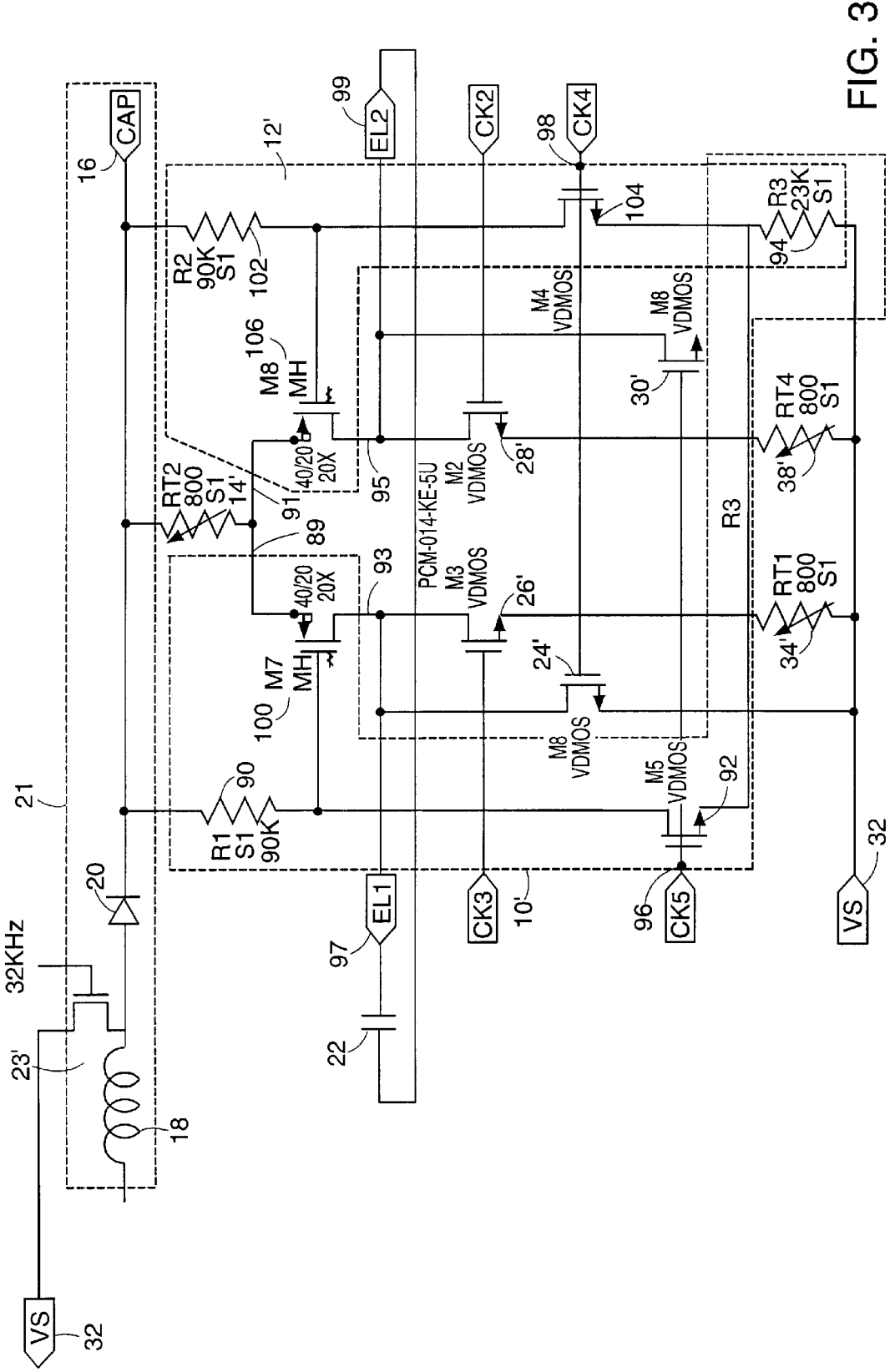
FIG. 3 is a transistor level schematic diagram of an embodiment of the invention.

In actual implementation, the switches in one embodiment are MOSFETs (see FIG. 3). In this embodiment switches 100 and 106 are connected such that their sources are in communication with resistor 14 and their drains are in communication with the capacitive load 22. As the voltage on the capacitive load 22 rises, it approaches the voltage value on the capacitor 16 of the boost converter 21. When this occurs, the voltage difference across the source and drain of the switches 100 and 106 becomes small and the switches transition to a shut off state. The time to reach this shut off state is approximately proportional to the current charging the capacitive load 22. Thus the value of resistor 14 determines the start of the shutoff state.

When switch 10 is opened as shown in the second state (FIG. 1(b)), the charging ceases and the voltage takes on a substantially constant value 52. When switch 26 is closed (FIG. 1(c)) the capacitive load 22 discharges 54 at substantially the same rate at which it was charged until the voltage returns to zero 56.

At this point the capacitive load 22 is recharged by the closing of switch 12 (FIG. 1(d)) with an opposite polarity to that shown in FIG. 1(a) and the voltage becomes linearly increasingly negative 58. When switch 12 is then opened (FIG. 1(e)) the voltage across the capacitive load 22 becomes substantially constant 60. Then the closing of switch 28 discharges the capacitive load 22 (FIG. 1(f)) at substantially the same rate at which it was charged 62, until zero voltage appears across the capacitive load 22. The cycle then repeats. In one embodiment these six states are repeated every 4 ms.

Referring to FIG. 3, a device constructed in accordance with the invention as shown in FIG. 1, includes a resistor 14' one terminal of which is connected to a boost converter 21 which includes a coil 18, a diode 20, and a capacitor 16, as previously described. A MOSFET device 23' controlled at its gate by a 32 KHz signal switches the coil 18 in the boost converter 21. The other terminal of resistor 14' is connected to the respective first terminals 89, 91 of two switches 10' and 12'. Each switch 10', 12' has a second terminal 93, 95, respectively, which is in communication with a respective terminal 97, 99 of capacitive load 22, and a respective control terminal 96, 98, by which the respective switch 10', 12' is turned on and off.

Switch 10' includes a resistor 90 connected between the boost converter 21 and the drain of a transistor 92. The source of transistor 92 is connected to reference voltage 32 through resistor 94. The gate of transistor 92 is the control terminal 96 of the switch 10' and is connected to a clocking line designated CK5. A voltage corresponding to a clocking cycle is applied to the gate of transistor 92, turning the transistor 92 on and off. The turning on and off of this transistor 92 controls the current flow through resistors 90, 94. A transistor 100, whose source is the input terminal 89 of switch 10' and whose drain is the output terminal 93 of switch 10', has a gate which is connected to the common node of resistor 90 and drain of transistor 92. As transistor 92 is turned on and off by the clocking voltage CK5 applied to its gate through control terminal 96, the resulting voltage drop across resistor 90 turns transistor 100 on and off, thereby alternately connecting and disconnecting the capacitive load 22 to the boost converter 21 as described with respect to FIG. 1.

Similarly, switch 12' includes a resistor 102 connected between the boost converter 21 and the drain of a transistor 104. The source of transistor 104 is connected to reference voltage 32 through the same resistor 94 by which the source of transistor 92 is connected to the reference voltage 32. The gate of transistor 104 is the control terminal 98 of the switch 12' and is connected to a clocking line designated CK4. A voltage corresponding to a clocking cycle is applied to the gate of transistor 104, turning transistor 104 on and off. The turning on and off of this transistor 104 controls the current flow through resistors 102, 94. A transistor 106, whose source is the input terminal 91 of switch 12' and whose drain is the output terminal 95 of switch 12', has a gate which is connected to the common node of resistor 102 and drain of transistor 104. As transistor 104 is turned on and off by the clocking voltage CK4 applied to its gate through control terminal 98, the resulting voltage drop across resistor 102 turns transistor 106 on and off, thereby alternately connecting and disconnecting the capacitive load 22 to the boost converter 21 as described with respect to FIG. 1.

Switch 24' in this embodiment is a transistor having a drain connected to the terminal 97 of capacitive load 22 and a source connected to reference voltage 32. The gate of switch 24' is the control terminal for the switch 24' and is connected to control terminal 98. As such the same clocking voltage CK4 applied to the control terminal of switch 12' is applied to switch 24'. Switch 30' in this embodiment is a transistor having a drain connected to the terminal 99 of capacitive load 22 and a source connected to reference voltage 32. The gate of switch 30' is the control terminal for the switch 30' and is connected to control terminal 96. Again, the same clocking voltage CK5 applied to the control terminal of switch 10' is applied to switch 30'.

The remaining switches 26', 28' are transistors and each transistor has its respective drain terminal connected to a respective terminal 97, 99 of the capacitive load 22, and its source terminal connected to reference voltage 32 through its respective resistor 34', 38'. The gate of each respective transistor is the respective control terminal for the respective switch. Each control terminal is connected to a respective clocking circuit which places a clocking voltage designated CK3 and CK2 respectively on the respective gate, thereby turning the respective switch 26', 28' on and off. The two diodes 42, 44 shown in FIG. 1, are provided by the parasitic diodes (from source to drain) of the transistors of switches 24', 30'. In one embodiment the transistors are MOSFETs.

Although the embodiment shown contemplates switches 10' and 12' which include two resistors and two MOSFETs, other embodiments are contemplated. In one such embodiment switches 10, 12 are single transistors, replacing transistors 100 and 106, whose gates are directly driven by clocking signals CK4 and CK5, rather than being controlled by the switching of additional transistors 92, 104 which are driven by clocking signals CK4 and CK5 as in the embodiment shown.

Figure 4:
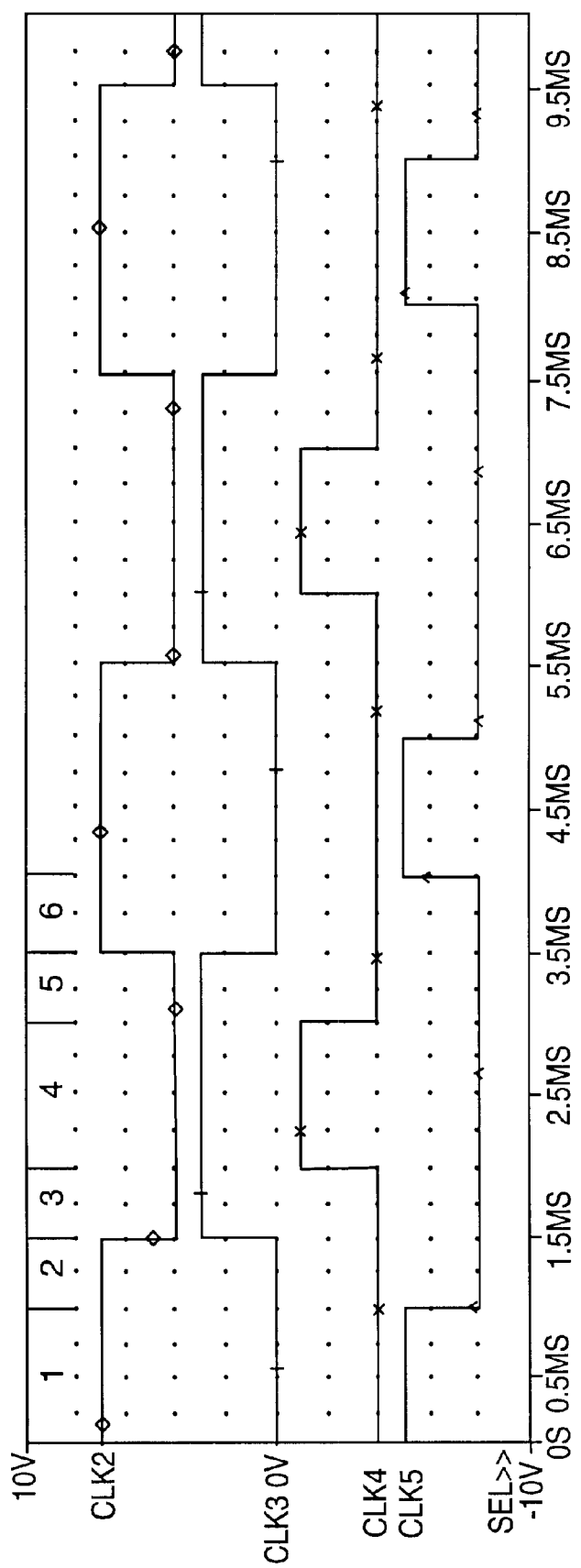
FIG. 4 is a switching clock diagram for the embodiment of the invention shown in FIG. 1.

Referring to FIG. 4, the clocking cycles (CK2, CK3, CK4, and CK5) for the embodiment of the invention shown in FIG. 3 are depicted. It is important to note that the voltages for clock cycles CK2, CK4 and CK5 have been offset to permit their display. Specifically clock cycle CK2 has been offset by 4 volts; clock cycle CK4 has been offset by −4 volts; and clock cycle CK5 has been offset by −8 volts.

Figure 5:
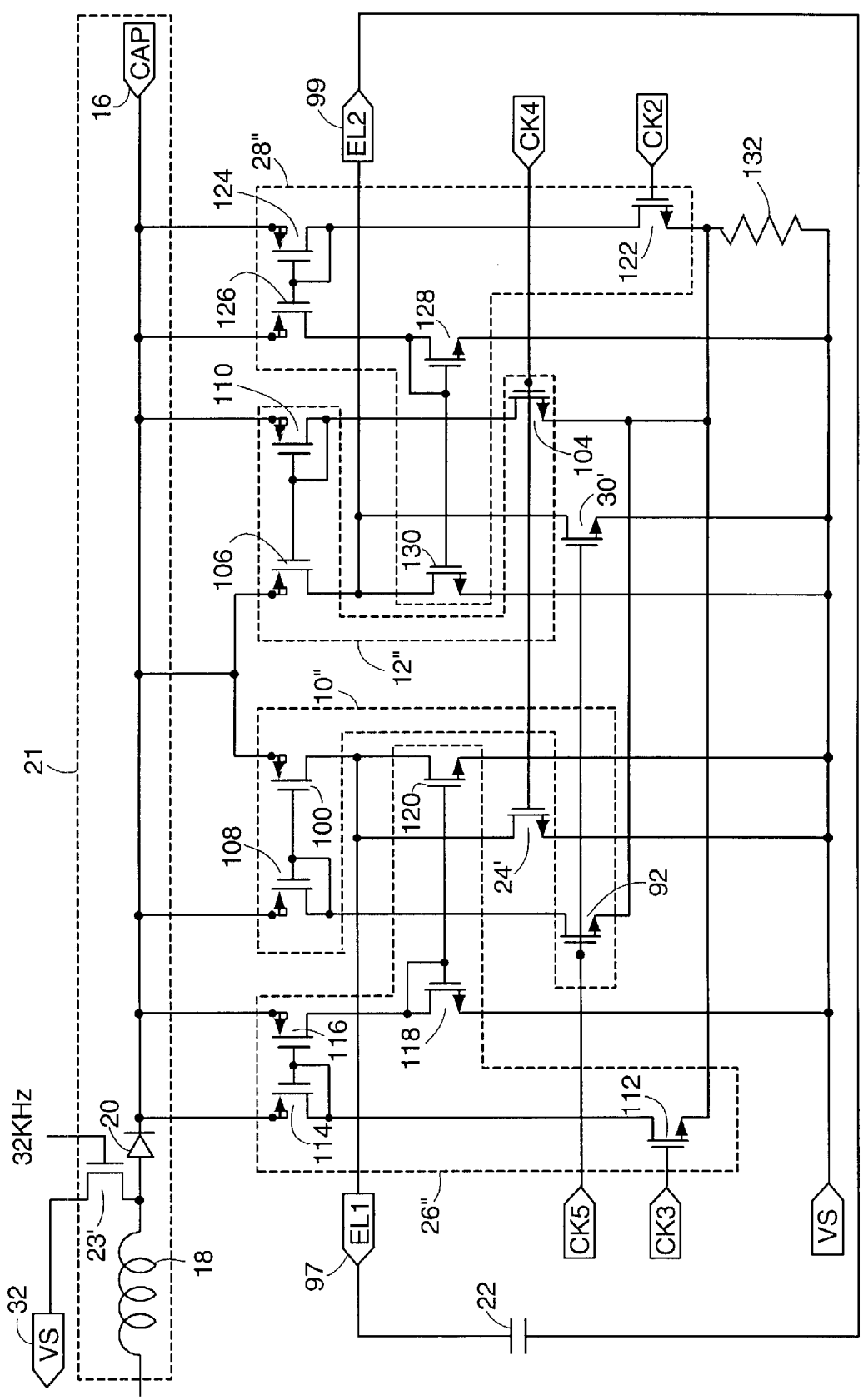
FIG. 5 is a transistor level schematic diagram of anotherr embodiment of the invention.

Referring to FIG. 5, another embodiment based on a current mirror configuration includes switches 10", 12", 26" and 28". Switch 10" includes transistors 92, 100 and 108, switch 12" includes transistors 104, 106 and 110, switch 26" includes transistors 112, 114, 116, 118 and 120, and switch 28" includes transistors 122, 124, 126, 128 and 130. The value of resistor 132 determines the current charging and discharging the capacitive load 22.

While the invention has been shown and described with reference to specific referred embodiments, it should be understood by those skilled in the art that various changes in form and detail may be made therein without departing from the spirit and scope of the invention as defined by the following claims.

What is claimed is:

1. A method for generating a voltage waveform across a capacitive load having a first load terminal and a second load terminal, comprising the steps of:
   closing a first switch connected between said first load terminal and a first terminal of a substantially constant current source;
   closing a second switch connected between said second load terminal and a second terminal of said substantially constant current source, whereby said capacitive load is charged at a substantially linear rate;
   opening said first switch;
   opening said second switch;
   closing a third switch connected between said first load terminal and said second load terminal, whereby said capacitive load is discharged at a substantially linear rate;
   closing a fourth switch connected between said second load terminal and said first terminal of said substantially constant current source;
   closing a fifth switch connected between said first load terminal and said second terminal of said substantially constant current source, whereby said capacitive load is charged at a substantially linear rate;
   opening said fourth switch;
   opening said third and fifth switches; and
   closing a sixth switch connected between said first load terminal and said second load terminal, whereby said capacitive load is discharged at a substantially linear rate.

2. The method of claim 1 further comprising the step of delaying closing of said sixth switch subsequent to the opening of one of said fourth and said fifth switches, thereby establishing a substantially zero current flow through said capacitive load.

3. A circuit for driving a capacitive load from a substantially constant current source comprising:
   a first switch connected between a first load terminal and a first terminal of said substantially constant current source;
   a second switch connected between a second load terminal and a second terminal of said substantially constant current source; and
   a third switch connected between said first load terminal and said second terminal of said substantially constant current source,
   a fourth switch connected between said second load terminal and said first terminal of said substantially constant current source;
   a fifth switch connected between said first load terminal and said second terminal of said substantially constant current source; and
   a sixth switch connected between said second load terminal and said second terminal of said substantially constant current source,
   wherein a substantially constant current linearly charges said capacitive load when said first and second switches are closed and said third switch is open, and wherein a substantially constant current is generated by the linear discharge of said capacitive load when said first and second switches are open and said third switch is closed; and
   wherein a substantially constant current linearly charges said capacitive load when said first, second and sixth switches are open and said fourth and fifth switches are closed, and wherein a substantially constant current is generated by the linear discharge of said capacitive load when said first, second, third, fourth and fifth switches are open and said sixth switch is closed.

4. A circuit for driving a capacitive load having a first load terminal and a second load terminal comprising:
   a first circuit terminal adapted to receive a first reference voltage;
   a second circuit terminal adapted to receive a second reference voltage;
   a first resistor having a first terminal and a second terminal, said first terminal of said first resistor in electrical communication with said first circuit terminal;
   a first switch having a first terminal in electrical communication with said second terminal of said first resistor and a second terminal in electrical communication with said first load terminal;
   a second switch having a first terminal in electrical communication with said second terminal of said first resistor and a second terminal in electrical communication with said second load terminal;
   a third switch having a first terminal in electrical communication with said first load terminal and a second terminal in electrical communication with said second circuit terminal;
   a fourth switch having a first terminal in electrical communication with said second load terminal and a second terminal in electrical communication with said second circuit terminal;
   a fifth switch having a first terminal and a second terminal, said first terminal of said fifth switch being in electrical communication with said first load terminal;
   a sixth switch having a first terminal and a second terminal, said first terminal of said sixth switch being in electrical communication with said second load terminal;
   a second resistor having a first terminal in electrical communication with said second terminal of said fifth switch and a second terminal in electrical communication with said second circuit terminal; and
   a third resistor having a first terminal in electrical communication with said second terminal of said sixth switch and a second terminal in electrical communication with said second circuit terminal, wherein a substantially constant current linearly charges said capacitive load during a first charging period when said first and second switches are closed and said third, fourth and fifth switches are open, wherein a substantially zero current delaying is established through said capacitive load when said first, second, third and fifth switches are open subsequent to said first charging state, wherein a substantially constant current is generated by the linear discharge of said capacitive load when said first, second, fourth, fifth and sixth switches are open and said third switch is closed, wherein a substantially constant current linearly charges said capacitive load during a second charging period when said first, second and sixth switches are open and said fourth and fifth switches are closed, wherein a substantially zero current delaying is established through said capacitive load when said first, second, fourth and sixth switches are open subsequent to said second charging state, wherein a substantially constant current is generated by the linear discharge of said capacitive load when said first, second, third, fourth and fifth switches are open and said sixth switch is closed.

* * * * *